United States Patent [19]
Tsujikado et al.

[11] Patent Number: 6,054,830
[45] Date of Patent: Apr. 25, 2000

[54] PULSE CONTROL METHOD AND SYSTEM USING MULTIPLIER

[75] Inventors: Seiji Tsujikado, Isehara; Masanori Kamiya, Fukisawa, both of Japan

[73] Assignee: International Business Machines Corporation, Armonk, N.Y.

[21] Appl. No.: 09/249,486

[22] Filed: Feb. 12, 1999

[30] Foreign Application Priority Data

Mar. 12, 1998 [JP] Japan .................................. 10-061635

[51] Int. Cl.$^7$ .................................................. G05B 19/25
[52] U.S. Cl. ...................................... 318/571; 364/474.31
[58] Field of Search .................................. 318/567, 600, 318/568, 18, 569, 570, 571, 573, 574; 364/474.28, 474.29, 474.3, 474.31

[56] References Cited

U.S. PATENT DOCUMENTS

| | | | |
|---|---|---|---|
| 4,150,329 | 4/1979 | Dahlstrom | 318/570 |
| 5,028,855 | 7/1991 | Distler et al. | 364/474.29 |
| 5,287,049 | 2/1994 | Olomski et al. | 318/568.1 |
| 5,465,037 | 11/1995 | Huissoon et al. | 318/568.11 |
| 5,610,823 | 3/1997 | Gregory | 364/474.15 |
| 5,637,969 | 6/1997 | Kato et al. | 318/432 |
| 5,854,544 | 12/1998 | Speth | 318/270 |

*Primary Examiner*—Jonathan Salata
*Attorney, Agent, or Firm*—McGinn & Gibb, PC; Louis J. Percello, Esq.

[57] ABSTRACT

A method and system for controlling pulse-driven actuators on multidimensional coordinates includes a cutting tool connected to the actuators of a machine tool. The cutting tool is controlled with a specified path and a specified velocity by controlling the output pulses of a multiplier. Data on the coordinates of a plurality of points including points A and B on the specified path and on the specified velocity F is received along with a command indicating an interpolation type. A linear interpolation is performed by a straight line between the point A and the point B, and the interpolated straight line is divided into minute lengths $\Delta L$ and a minute length $\Delta La$ correspondingly to a minute time $\Delta T$. $\Delta T$ is changed by sending either a first control signal for keeping the specified velocity F corresponding to the minute length $\Delta L$ or a second control signal for keeping the specified velocity F corresponding to the minute length $\Delta La$ to a pulse oscillator for supplying pulses to the multiplier. If the selection of the control signals is appropriate, the cutting tool can keep the specified velocity F when it moves on either portion of $\Delta L$ or $\Delta La$.

17 Claims, 12 Drawing Sheets

| Input | | | | | | Output | | |
|---|---|---|---|---|---|---|---|---|
| CLEAR | ENABLE | STROBE | BINARY RATE<br>F E D C B A | Number of clock pulses | UNITY/<br>CASCADE | Logical level<br>/Number or pulses | | |
| | | | | | | Y | Z | ENABLE |
| H | x | H | x x x x x x | x | H | L | H | L |
| L | L | L | L L L L L L | 64 | H | L | H | L |
| L | L | L | L L L L L H | 64 | H | 1 | 1 | L |
| L | L | L | L L L L H L | 64 | H | 2 | 2 | L |
| L | L | L | L L L H L L | 64 | H | 4 | 4 | L |
| L | L | L | L L H L L L | 64 | H | 8 | 8 | L |
| L | L | L | L H L L L L | 64 | H | 16 | 16 | L |
| L | L | L | H L L L L L | 64 | H | 32 | 32 | L |
| L | L | L | H H H H H H | 64 | H | 63 | 63 | L |
| L | L | L | H H H H H H | 64 | L | H | H | L |
| L | L | L | H L L H L L | 64 | H | 36 | 36 | L |

Figure 10
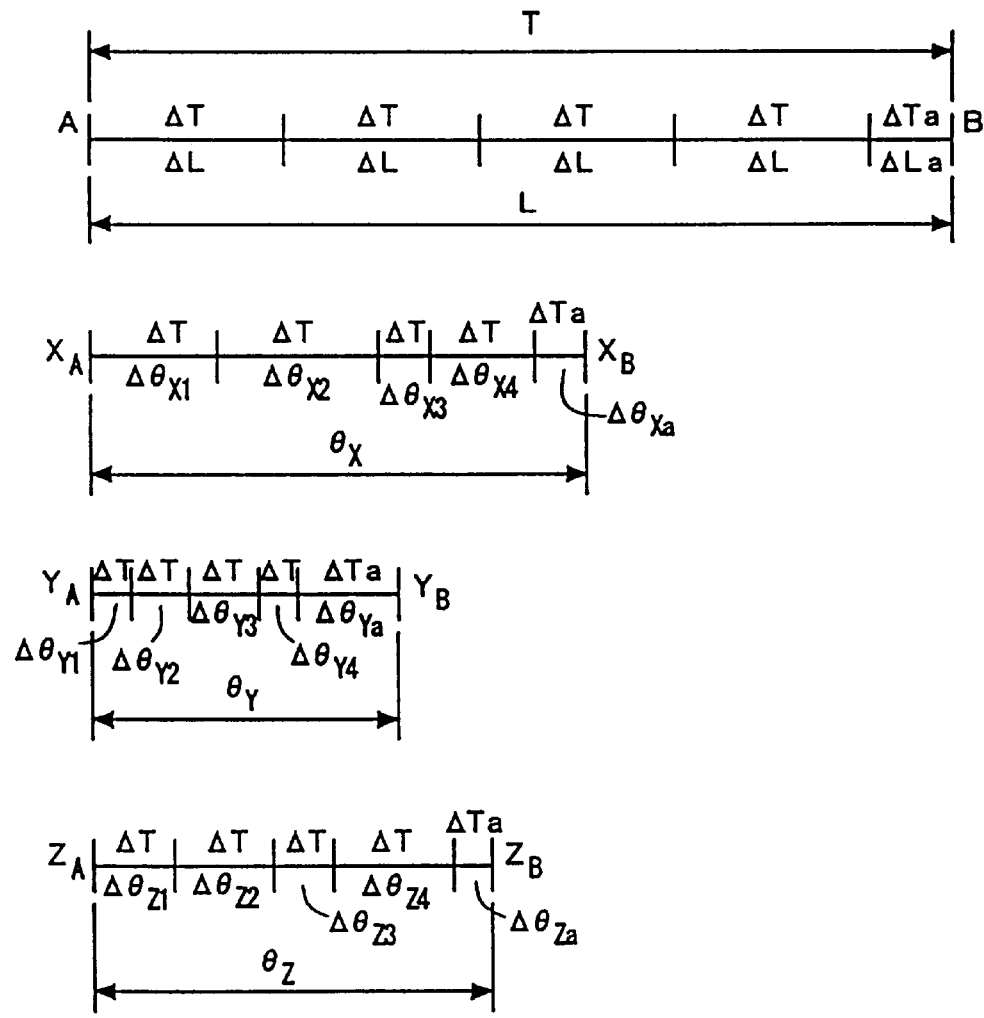
[Figure 12]
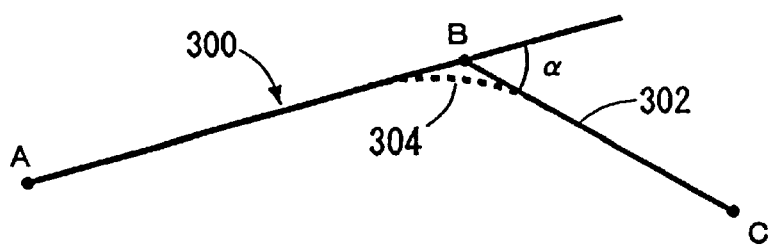

FIG.15 PRIOR ART

| BRM102 = 12 BITS, BRM106 = 12 BITS, m = n = 1/2 | | | | | | | |
|---|---|---|---|---|---|---|---|
| fi (Hz) | BRM102 | nfo (Hz) | fo (Hz) | BRM106 | mfx (Hz) | fx (Hz) | ΔT (msec) |
| 16,392,003 | 4,095 | 16,388,001 | 8,194,001 | 4,095 | 8,192,000 | 4,096,000 | 1.000000000 |
| 16,392,003 | 4,094 | 16,383,999 | 8,192,000 | 4,095 | 8,190,000 | 4,095,000 | 1.00024426 |
| 16,392,003 | 4,093 | 16,379,997 | 8,189,999 | 4,095 | 8,187,999 | 4,094,000 | 1.00048864 |
| 16,392,003 | 4,092 | 16,375,995 | 8,187,998 | 4,095 | 8,185,999 | 4,092,999 | 1.00073314 |
| 16,392,003 | 4,091 | 16,371,993 | 8,185,997 | 4,095 | 8,183,998 | 4,091,999 | 1.00097776 |
| 16,392,003 | 4,090 | 16,367,991 | 8,183,996 | 4,095 | 8,181,998 | 4,090,999 | 1.00122249 |
| 16,392,003 | 4,089 | 16,363,989 | 8,181,995 | 4,095 | 8,179,997 | 4,089,999 | 1.00146735 |
| 16,392,003 | 4,088 | 16,359,987 | 8,179,994 | 4,095 | 8,177,997 | 4,088,998 | 1.00171233 |
| 16,392,003 | 4,087 | 16,355,985 | 8,177,993 | 4,095 | 8,175,996 | 4,087,998 | 1.00195743 |
| 16,392,003 | 4,086 | 16,351,983 | 8,175,992 | 4,095 | 8,173,996 | 4,086,998 | 1.00220264 |
| 16,392,003 | 4,085 | 16,347,982 | 8,173,991 | 4,095 | 8,171,995 | 4,085,998 | 1.00244798 |
| 16,392,003 | 4,084 | 16,343,980 | 8,171,990 | 4,095 | 8,169,995 | 4,084,997 | 1.00269344 |
| 16,392,003 | 4,083 | 16,339,978 | 8,169,989 | 4,095 | 8,167,994 | 4,083,997 | 1.00293902 |
| 16,392,003 | 4,082 | 16,335,976 | 8,167,988 | 4,095 | 8,165,994 | 4,082,997 | 1.00318471 |
| 16,392,003 | 4,081 | 16,331,974 | 8,165,987 | 4,095 | 8,163,993 | 4,081,997 | 1.00343053 |
| 16,392,003 | 4,080 | 16,327,972 | 8,163,986 | 4,095 | 8,161,993 | 4,080,996 | 1.00367647 |
| 16,392,003 | 4,079 | 16,323,970 | 8,161,985 | 4,095 | 8,159,992 | 4,079,996 | 1.00392253 |
| 16,392,003 | 4,078 | 16,319,968 | 8,159,984 | 4,095 | 8,157,992 | 4,078,996 | 1.00416871 |
| 16,392,003 | 4,077 | 16,315,966 | 8,157,983 | 4,095 | 8,155,991 | 4,077,996 | 1.00441501 |
| 16,392,003 | 4,076 | 16,311,964 | 8,155,982 | 4,095 | 8,153,991 | 4,076,995 | 1.00466143 |
| 16,392,003 | 4,075 | 16,307,962 | 8,153,981 | 4,095 | 8,151,990 | 4,075,995 | 1.00490798 |
| 16,392,003 | 4,074 | 16,303,960 | 8,151,980 | 4,095 | 8,149,990 | 4,074,995 | 1.00515464 |
| 16,392,003 | 4,073 | 16,299,958 | 8,149,979 | 4,095 | 8,147,989 | 4,073,995 | 1.00540142 |

FIG.16 PRIOR ART

| BRM102 = 6 BITS, BRM106 = 12 BITS, m = n = 1/2 | | | | | | | |
|---|---|---|---|---|---|---|---|
| fi (Hz) | BRM102 | nfo (Hz) | fo (Hz) | BRM106 | mfx (Hz) | fx (Hz) | ΔT (msec) |
| 16,648,128 | 63 | 16,388,001 | 8,194,001 | 4,095 | 8,192,000 | 4,096,000 | 0.99999999 |
| 16,648,128 | 62 | 16,127,874 | 8,063,937 | 4,095 | 8,061,968 | 4,030,984 | 1.01612902 |
| 16,648,128 | 61 | 15,867,747 | 7,933,874 | 4,095 | 7,931,937 | 3,965,968 | 1.03278687 |
| 16,648,128 | 60 | 15,607,620 | 7,803,810 | 4,095 | 7,801,905 | 3,900,952 | 1.04999999 |
| 16,648,128 | 59 | 15,347,493 | 7,673,747 | 4,095 | 7,671,873 | 3,835,937 | 1.06779660 |
| 16,648,128 | 58 | 15,087,366 | 7,543,683 | 4,095 | 7,541,841 | 3,770,921 | 1.08620689 |
| 16,648,128 | 57 | 14,827,239 | 7,413,620 | 4,095 | 7,411,810 | 3,705,905 | 1.10526315 |
| 16,648,128 | 56 | 14,567,112 | 7,283,556 | 4,095 | 7,281,778 | 3,640,889 | 1.12499999 |
| 16,648,128 | 55 | 14,306,985 | 7,153,493 | 4,095 | 7,151,746 | 3,575,873 | 1.14545453 |
| 16,648,128 | 54 | 14,046,858 | 7,023,429 | 4,095 | 7,021,714 | 3,510,857 | 1.16666666 |
| 16,648,128 | 53 | 13,786,731 | 6,893,366 | 4,095 | 6,891,683 | 3,445,841 | 1.18867923 |
| 16,648,128 | 52 | 13,526,604 | 6,763,302 | 4,095 | 6,761,651 | 3,380,825 | 1.21153845 |
| 16,648,128 | 51 | 13,266,477 | 6,633,239 | 4,095 | 6,631,619 | 3,315,810 | 1.23529411 |
| 16,648,128 | 50 | 13,006,350 | 6,503,175 | 4,095 | 6,501,587 | 3,250,794 | 1.25999999 |
| 16,648,128 | 49 | 12,746,223 | 6,373,112 | 4,095 | 6,371,556 | 3,185,778 | 1.28571427 |
| 16,648,128 | 48 | 12,486,096 | 6,243,048 | 4,095 | 6,241,524 | 3,120,762 | 1.31249999 |
| 16,648,128 | 47 | 12,225,969 | 6,112,985 | 4,095 | 6,111,492 | 3,055,746 | 1.34042552 |
| 16,648,128 | 46 | 11,965,842 | 5,982,921 | 4,095 | 5,981,460 | 2,990,730 | 1.36956520 |
| 16,648,128 | 45 | 11,705,715 | 5,852,858 | 4,095 | 5,851,429 | 2,925,714 | 1.39999999 |
| 16,648,128 | 44 | 11,445,588 | 5,722,794 | 4,095 | 5,721,397 | 2,860,698 | 1.43181817 |
| 16,648,128 | 43 | 11,185,461 | 5,592,731 | 4,095 | 5,591,365 | 2,795,683 | 1.46511626 |
| 16,648,128 | 42 | 10,925,334 | 5,462,667 | 4,095 | 5,461,333 | 2,730,667 | 1.49999999 |
| 16,648,128 | 41 | 10,665,207 | 5,332,604 | 4,095 | 5,331,302 | 2,665,651 | 1.53658835 |

PULSE CONTROL METHOD AND SYSTEM USING MULTIPLIER

BACKGROUND OF THE INVENTION

1. Field of the Invention

The present invention relates to the control of pulse-driven actuators for machine tools or industrial robots.

2. Description of the Related Art

In computer-controlled machine tools or industrial robots, a controlled portion moves along a programmed track at a specified velocity.

Recently, as the working accuracy of machine tools increases, demands for equalization of the moving velocity and flexible change of the moving velocity according to the shape of the moving path are put on pulse-controlled systems such as machine tools. In machine tools of the orthogonal coordinate system having two or three axes, pulse-driven actuators are provided correspondingly to the respective orthogonal coordinate axis. Each actuator is directly or indirectly connected to a controlled portion, which moves along a programmed track with a function of velocity obtained through vector composition of the actuator moving velocity along each axis and time. A pulse motor is generally used for the actuator, and the total quantity of pulses applied to the pulse motor determines the movement amount, while the number of pulses per unit time determines the movement velocity. A rate multiplier is used for controlling pulses supplied to such actuator.

FIG. 1 is a block diagram of the conventional actuator control system for use with a machine tool. An oscillator OSC generates a pulse of a fixed frequency. 6-bit binary rate multipliers BRM1 to BRM3 are provided to supply pulses to the respective actuators on three orthogonal axes X1 to X3. An MPU sequentially executes a control program stored in a memory and sends actuator control data to 6-bit input registers R1 to R3. The input register supplies a 6-bit designation rate for determining the conversion rate between the number of input pulses and the number of output pulses to the rate input of the multiplier.

The operation of the above system is described with reference to FIG. 2 as an example, in which a controlled portion such as the cutting tool of a machine tool is moved from a coordinate point A to a point K. In the memory, a program for moving the cutting tool along a track P is stored. In the program, the coordinates of the plurality of points A to K through which the track P is passing, the velocity data of the cutting tool, and a command specifying the interpolation type between each point are included. The interpolation type includes linear interpolation, circular interpolation, and the like. The velocity of the cutting tool depends on external factors such as the thickness of a workpiece, and working accuracy, and the velocity is specified so as to be constant over the whole track.

To move the cutting tool from the point A to the point B, the MPU receives an execution command indicating a linear interpolation from the memory, and data on the coordinates of the points A and B and on the moving velocity between them. The MPU interpolates the track between the points A and B by a straight line Q of a length L according to the execution command, further divides the length L into a plurality of minute lengths $\Delta L$ through which the cutting tool moves along the straight line Q in a minute time $\Delta T$, and calculates the minute length component through which the actuator on each axis must move correspondingly to the minute length $\Delta L$.

Further, the MPU sends a predetermined bit pattern to the input register so that the multiplier can output pulses in a number corresponding to the minute length $\Delta L$ during the minute time $\Delta T$. The actuators X1 to X3 receive the pulses outputted from the corresponding multipliers, and operate in synchronism with each other to move the controlled portion along the straight line Q. $\Delta T$ is the time of one cycle over which the rate multiplier having a predetermined number of bits operates according to the frequency of the input pulse.

To move the cutting tool along the interpolated straight line Q at a specified velocity, the MPU calculates the minute length $\Delta L$ through which the cutting tool must move within the minute time $\Delta T$. That is, the specified velocity is expressed by $\Delta L/\Delta T$. However, the minute time $\Delta T$ and the specified velocity F cannot be determined so that the minute length $\Delta L$ uniformly divides the length L.

Thus, the last minute length is shorter or longer than the minute length $\Delta L$, and the velocity of the cutting tool becomes slower or faster than the specified velocity if the minute time $\Delta T$ is constant.

When the controlled portion is moved from point A to point K by repeating the above operation, the velocity becomes lower or higher than the specified velocity every time just before the coordinates of the end point of the interpolated line are reached. Thus, a uniform velocity cannot be obtained over the whole track P. Further, the rate multiplier always has jitter due to its operation principle in the output frequency even if pulses are provided to the input at equal intervals. Thus, the operation velocity of the controlled portion varies to adversely affect the synchronizing operation of the three axis, which leads to accuracy degradation to the specified path.

Additionally, when the respective coordinates given on the track P of FIG. 2 are linearly interpolated (e.g., if the angle between the interconnected segments connecting the coordinates, such as formed at the connecting point between the segment AB and the segment BC, becomes large and the interpolated straight line steeply bends at the connecting point), the actual track of the cutting tool deviates from the specified track when the cutting tool is moved at the specified velocity commanded by the program. To remedy such a problem, conventionally the operator manually forces the velocity to change.

U.S. Pat. No. 3,878,372 discloses a circuit for pulse control of the moving of a machine tool comprising two or three axes, and which calculates a feed rate number from the programmed moving amounts and moving velocities along the respective axis perpendicular to each other. The feed rate number represents the ratio of vector velocity to vector composition value of the moving amount along each axis, and the vector composition value is calculated to calculate the feed rate number.

The feed rate generator includes a rate multiplier for calculating the feed rate number, and further, the function generator includes a rate multiplier for determining the moving amount of the actuator. The feed rate number is supplied to the multiplier of the function generator. The output of the function generator is supplied to a digital control loop as a pulse rate corresponding to the particular axis.

SUMMARY OF THE INVENTION

In view of the foregoing and other problems and drawbacks of the conventional systems and methods, it is an object of the present invention to provide a method and system for controlling pulse-driven actuators.

Another object of the present invention is to provide a method and system for controlling actuators, which is suitable for multi-axial or articulated machine tools or robots, and in which the cooperation velocity of a controlled portion can be kept constant.

Yet another object of the present invention is to provide a method and system for controlling actuators, in which a specified track can be accurately traced.

In a non-limiting preferred embodiment, the control method of the present invention is implemented in a control system using a multiplier connected to a variable-frequency pulse oscillator. The multiplier supplies pulses controlled in frequency to the pulse-driven actuator, and the total quantity of pulses during a predetermined time is proportional to the operation amount of the actuator, while the pulse frequency is proportional to the operation velocity.

According to a first aspect of the present invention, the processing unit calculates a minute length $\Delta L$ keeping a specified velocity F for each minute time $\Delta T$ along an interpolated line of a length L. Further, the processing unit controls the multiplier so as to send pulses in a number corresponding to the minute length $\Delta L$ to the actuator during the minute time $\Delta T$, and repeats this operation to control the operation of the controlled portion. The controlled portion is directly or indirectly connected to the actuator, and moves according to the movement of the actuator. Preferably, the length L is divided by the minute length $\Delta L$ and a minute length $\Delta Lx$ different from $\Delta L$, and a first control signal for keeping the specified velocity F is sent to the pulse oscillator when executing the minute length $\Delta L$. When the frequency of the pulse generator supplies pulses of a frequency corresponding to the first control signal to the multiplier, one cycle of the multiplier is determined as the minute time $\Delta T$, and the multiplier outputs pulses corresponding to the minute length $\Delta L$ during the minute time $\Delta T$.

To execute the minute length $\Delta Lx$, a second control signal for keeping the specified velocity F is sent to the pulse oscillator. The second control signal has a value different from the first control signal. When the frequency of the pulse oscillator sends pulses of a frequency corresponding to the second control signal to the multiplier, one cycle of multiplier is determined as another minute time $\Delta Tx$, and the multiplier outputs pulses corresponding to the minute length $\Delta Lx$ during the minute time $\Delta Tx$. As a result, the length L of the interpolated line is divided by the minute length $\Delta L$ and the minute length $\Delta Lx$, and the minute time $\Delta T$ is made to correspond to the minute length $\Delta L$ while the minute time $\Delta Tx$ is made to correspond to the minute length $\Delta Lx$, thereby enabling the specified velocity F to be maintained when the controlled portion moves along either minute length.

In the present invention, the mutual positional relationship between the minute length $\Delta L$ and the minute length $\Delta La$ in the length L is not limited, as long as the minute length $\Delta L$ corresponds to the minute time $\Delta T$ and the minute length $\Delta Lx$ corresponds to the minute time $\Delta Tx$.

According to a second aspect of the present invention, as the minute length $\Delta L$, a minute length $\Delta La$ shorter than $\Delta L$ is selected. A method is provided in which the timing for executing the minute length $\Delta La$ is determined by the Equation $L-\Sigma\Delta L<\Delta L$.

The sum of the minute length $\Delta La$ and $\Sigma\Delta L$ equals the length L. $\Sigma\Delta L$ is the sum of the minute lengths $\Delta L$ for which in a certain interpolated line L, the coordinate calculation has been ended and a designation rate has been sent to the multiplier to complete the execution. As a result, at every minute time $\Delta T$, the multiplier outputs pulses in a number corresponding to the minute length $\Delta L$ determined by the minute time $\Delta T$ and the specified velocity F, from the coordinate point that is the starting point of the interpolated line, and can employ the minute time $\Delta Ta$ shorter than the minute time $\Delta T$ when executing the minute length $\Delta La$ including the end point of the interpolated line.

As a further aspect, the minute length including the end point is selected as a minute length $\Delta Lb$ longer than $\Delta L$ and shorter than $2\Delta L$. The timing for executing the minute length $\Delta Lb$ is determined by the Equation $\Delta L<L-\Sigma\Delta L<2\Delta L$. The sum of the minute length $\Delta Lb$ and $\Sigma\Delta L$ is equal to the length L. The minute time $\Delta Tb$ during which the movement is made along the minute length $\Delta Lb$ at the specified velocity F is longer than $\Delta T$, and the processing unit can acquire a calculation time equal to or longer than the minute time $\Delta T$ when calculating the minute length $\Delta Lb$. Accordingly, a designation rate can be supplied to the multiplier within a predetermined time, thereby to perform a continuous operation without interrupting the actuator operation.

The above aspects of the present invention are not limited to the orthogonal coordinate system, and can also easily be applied to a coordinate system having an articulation axis or other coordinate systems by performing the required coordinate transformation by the processing unit. In this case, the multiplier is provided corresponding to the actuator of each axis, the processing unit calculates the minute length component of each axis which is corresponding to the minute length $\Delta L$, and controls the designation rate of the multiplier corresponding to each axis according to the minute length component of each axis.

The control method of the present invention controls the output frequency of the pulse oscillator to make the operation velocity of the controlled portion constant. Thus, if a designation rate corresponding to the moving amount of each axis is provided as the designation rate of the multiplier corresponding to each axis, the actuators on the respective axis operate in synchronism with each other to keep the velocity of the controlled portion constant in a three-dimensional space.

According to a third aspect of the present invention, a control method is provided in which the angle between the tangents of the adjacent interpolated lines is calculated to perform an override. By supplying a first or second control signal to the control input of the pulse oscillator according to the angle between the tangents, the actuator velocity can be made lower than the programmed specified velocity to accurately move the controlled portion along the specified path if the angle between the tangents is large. Since the pulse oscillator is controlled according to the calculation result of the processing unit to slow down the actuator, no change of the program or operator intervention is needed.

According to a fourth aspect of the present invention, a control system is provided in which each aspect of the present invention is implemented by combining a variable-frequency pulse oscillator, a multiplier, and a processing unit.

Further, a control system is provided in which the above method is implemented by using a multiplier instead of the variable-frequency pulse oscillator, and connecting multipliers in two stages. The multipliers in the first stage serve as a frequency converter to control the operation velocity of actuators, and the multipliers in the second stage control the amount of pulses supplied to each axis, thereby to control the track for the controlled portion. Moreover, in accordance with the program, the processing unit performs the calculation for carrying out the above method and controls the pulse oscillator and the multipliers.

Further, in accordance with a fifth aspect of the present invention, a divider is provided in the rear stage of the multiplier to decrease the jitter contained in the output pulse of the multiplier, thereby to smoothly control the actuator. The designation rate of the multiplier is set to n or m times the frequency obtained at the output of the divider in the rear stage, thereby generating pulses of a predetermined frequency having less jitter at the divider output.

Thus, the present invention provides a method and system for controlling pulse-driven actuators.

Further, a method and system are provided for controlling actuators which are suitable for multi-axial or articulated machine tools or robots, and in which the operation velocity can be kept constant.

Furthermore, a method and system are provided for controlling actuators to accurately trace an indicated track.

The present disclosure relates to subject matter contained in Japanese Patent Application No. 10-061635, filed Mar. 12, 1998, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which:

FIG. 10 is a figure for explaining an interpolated straight line of length L and the movement of the actuator on each axis if actuators including axes of the articulated system are controlled;

FIG. 12 is a diagram for explaining another control method for implementing an override using the control system of FIG. 6;

FIG. 15 illustrates a calculation example of the minute time of the present control system; and FIG. 16 illustrates a calculation example of the minute time of the present control system.

DETAILED DESCRIPTION OF PREFERRED EMBODIMENTS OF THE INVENTION

The embodiments shown below are to describe an implementation mode of the present invention, and it is intended that an implementation mode obtained by modifying these embodiments without departing from the gist of the present invention is also included in the scope of the present invention.

Figure 1:
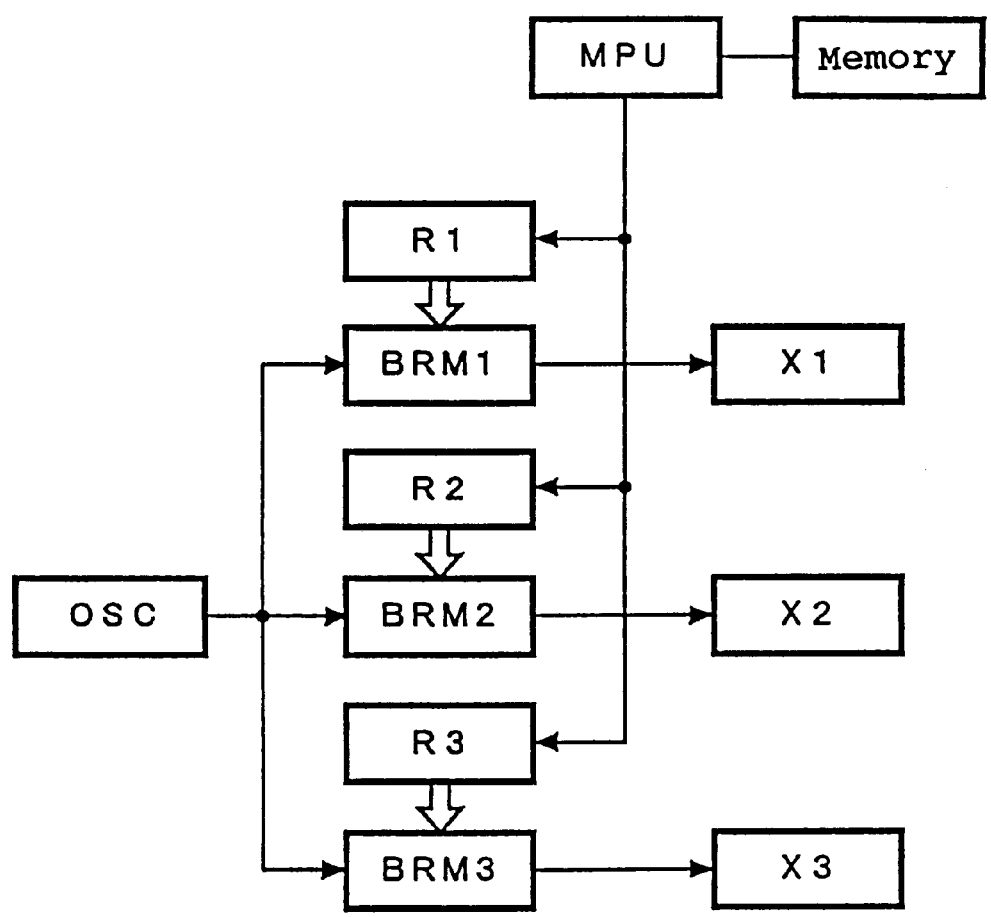
FIG. 1 is a block diagram of a conventional control system.
Figure 2:
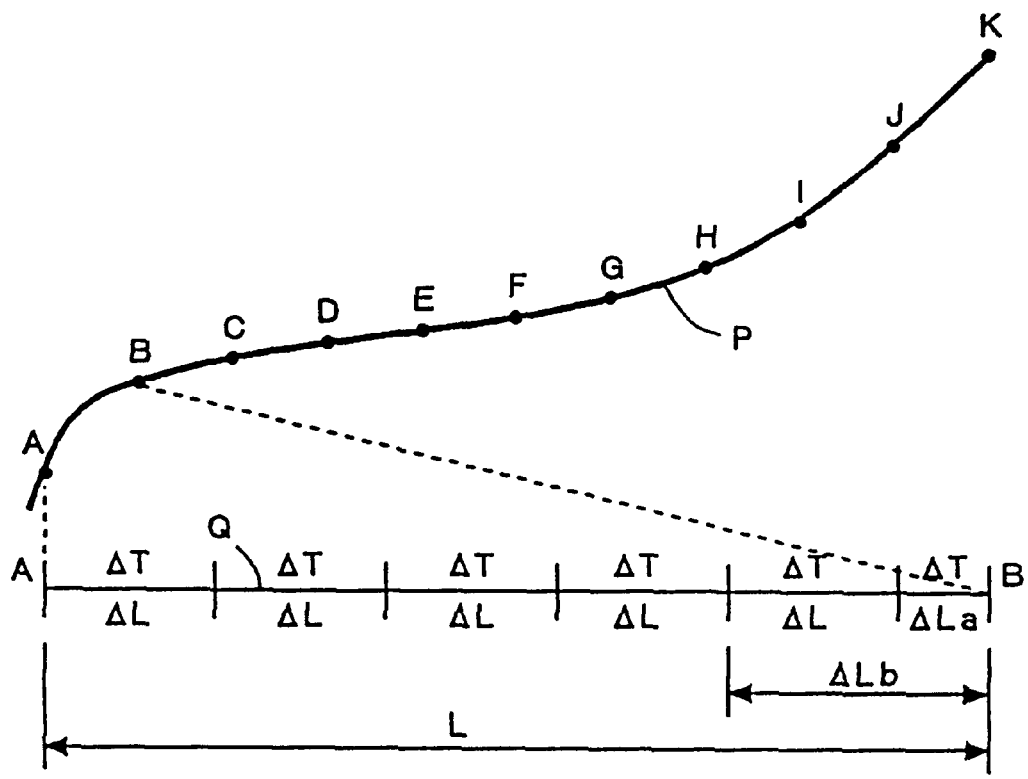
FIG. 2 is a figure for explaining the operation of the system of FIG. 1.
Figure 3:
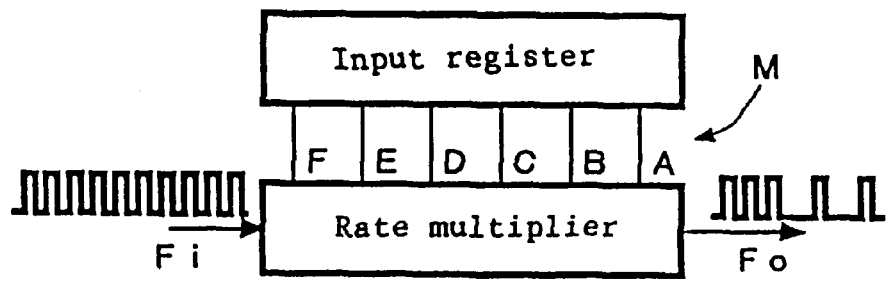
FIG. 3 is a block diagram for explaining the operation of the binary rate multiplier used in the present invention.

FIG. 3 is a block diagram for explaining the operation principle of multipliers used in the present invention, by taking a 6-bit binary rate multiplier as an example.

The multiplier has a pulse input, a pulse output, and a rate input, and to the rate input, a designation rate M is set in a binary number from an input register, and the number of pulses supplied to the pulse input within a fixed time is converted to the number of output pulses corresponding to the value of M within the same time, and sent out from the pulse output. That is, the operation of the multiplier corresponds to converting the frequency of input pulses to the frequency of output pulses according to the designation rate M.

In the multiplier of FIG. 3, the designation rate M is made up of 6 bits from the lowermost digit A to the uppermost digit F, any binary value from 0 to 63 (decimal) stored in the register can be set. Between the input frequency Fi and the output frequency Fo, there is a relationship Fo=Fi×(M/64), and M is specified as:

$$M = F \cdot 2^5 +$$
$$E \cdot 2^4 +$$
$$D \cdot 2^3 +$$
$$C \cdot 2^2 +$$
$$B \cdot 2^1 +$$
$$A,$$

and for instance, M=110010 (=$50_{10}$) is inputted, the output frequency is 50/64 times the input frequency.

In the rate multiplier, from the point of operation principle, the pulse interval of the output frequency does not become uniform even if a frequency having a fixed pulse interval is inputted, and the number of pulses within a predetermined time for count-up is merely converted.

Figure 4:
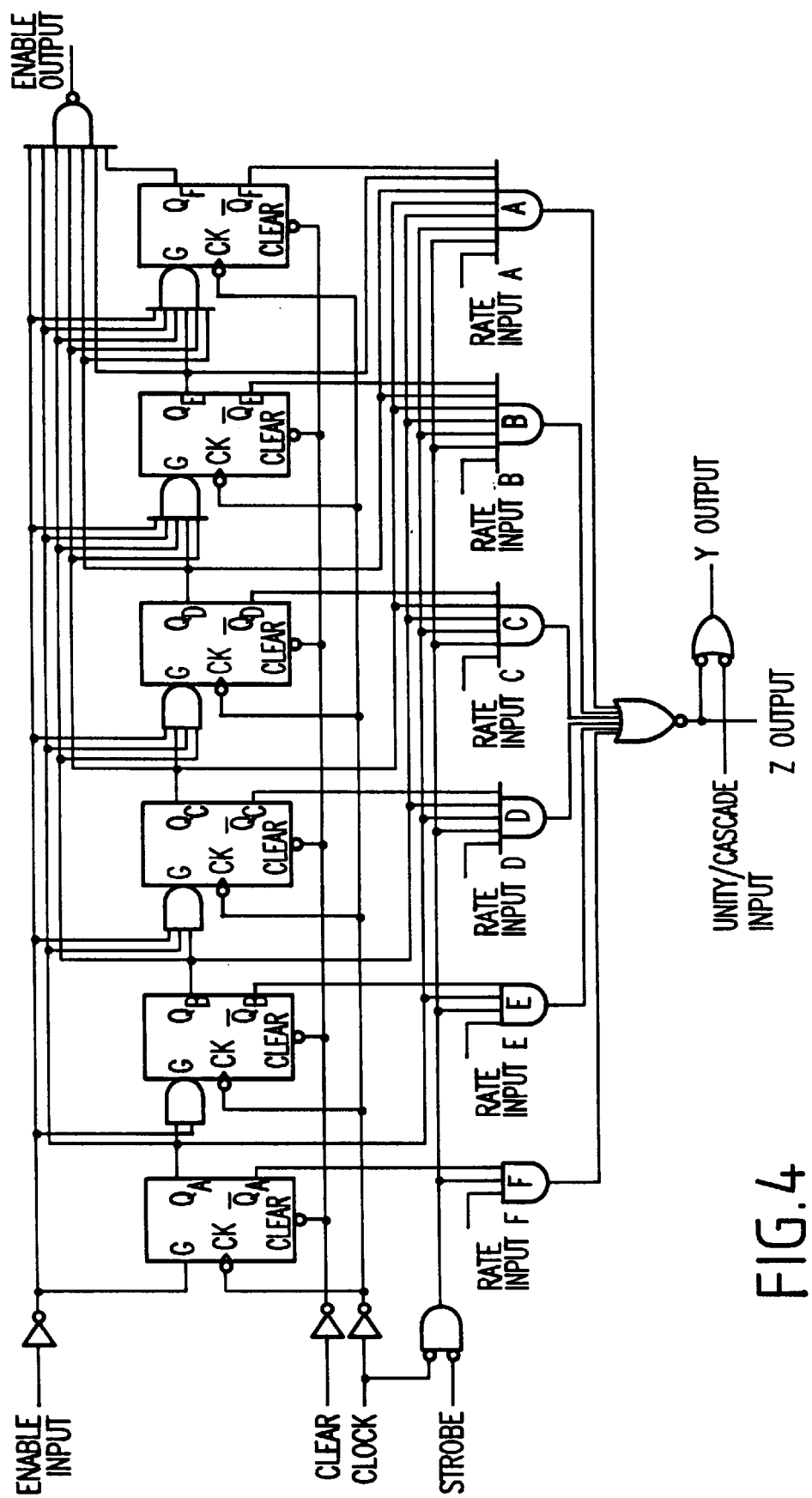
FIG. 4 is a functional block diagram of an IC for the multiplier which is shown by SN7497.
Figures 5, 6:
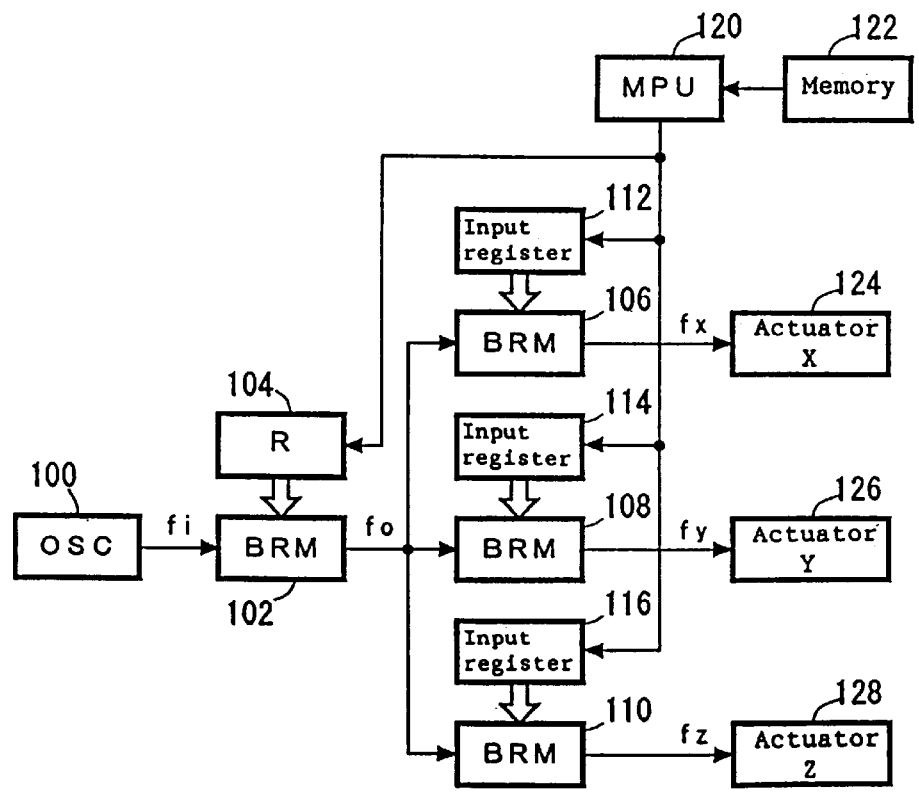
FIG. 5 is a operational function table of the multiplier SN7497.
FIG. 6 is a block diagram of an embodiment of the control system of the present invention.

FIG. 4 is a functional block diagram of an IC for a 6-bit multiplier shown by for example, "SN7497", and FIG. 5 is an operational function table. Six flip-flops in FIG. 4 make up a counter, and CLOCK is sequentially divided. The output of each flip-flop is sent to gates A to F, and each gate sends out the output of the flip-flop to Z OUTPUT on the condition of the specification of RATE INPUT.

When only RATE INPUT F is set, 32/64 times pulses are outputted, and thus, for every other pulse, output pulses are outputted at a uniform interval. However, if F and E are simultaneously set, the pulse interval of output pulses does not become uniform since 48/64 times pulses are outputted. The time taken for the multiplier to count 64 pulses and complete the operation of the cycle depends on the number of bits of the multiplier and the frequency of input pulses.

FIG. 6 is a schematic block diagram showing an embodiment according to the present invention of a control system for a machine tool, in which the multiplier whose principle has been described above is used. This control system controls the movement of the controlled portion of a cutting tool or the like in three directions (e.g., the X-, Y-, and Z-axes) which are perpendicularly intersecting each other. However, the present invention can be applied not only to a machine tool of the orthogonal three-axis system, but application to other multi-axial or articulated machine tools is also excellent.

In FIG. 6, a pulse oscillator 100 generates pulses having a frequency fi. A binary rate multiplier 102 has a counter portion made up of 12 bits, and has a pulse input connected to the output of the pulse oscillator 100, and a rate input connected to the parallel output of a 12-bit input register 104. The input of the input register 104 is connected to a processing unit (MPU) 120. The multiplier 102 converts the pulses having the frequency fi received from the pulse generator 100 to pulses having frequency fo according to a value determined by a designation rate, and outputs them. The output of the multiplier 102 is connected to the pulse inputs of 12-bit binary rate multipliers 106, 108, and 110, respectively. The rate inputs of the multipliers 106, 108, and 110 are connected to the parallel outputs of 12-bit input registers 112, 114, and 116, respectively.

The multipliers 106, 108, and 110 convert pulses of the frequency fo to pulses of frequencies fx, fy, and fz according to their respective designation rates. The multipliers 102, 106, 108, and 110 include a count-up circuit, respectively. The count operation is reset each time 4,096 pulses are inputted and the count is restarted. The inputs of the input registers 112, 114, and 116 are connected to the MPU 120. The MPU 120, in turn, is connected to a memory 122.

Stored in the memory 122 are data on the three-dimensional coordinates of a plurality of points on the track along which a cutting tool controlled by this control system moves, data on a specified velocity F between each coordinate, and a command indicating the type of the interpolation between each point. However, in the present invention, the MPU may perform the execution while directly receiving the command and data from the exterior through a reading unit, without storing them in the memory.

The outputs of the multipliers 106, 108, and 110 are connected to actuators 124, 126, and 128, respectively. The respective actuators are positioned so as to operate along the X-, Y-, and Z-axes which are orthogonal to each other, and driven by pulses. Each actuator includes a pulse-driven apparatus such as a linear motor, servo motor, or pulse motor. The quantity of pulses is proportional to the moving amount of each actuator, while the frequencies fx, fy, and fz of output pulses are proportional to the moving velocities of the actuators 124, 126 and 128, respectively.

The three multipliers 106, 108, and 110 receive the same pulse from the multiplier 102 to operate in synchronism with each other. The track and velocity of the cutting tool when the actuators on the respective axes operate in synchronism with each other are obtained as a function of the composition of the velocity vectors of the actuators on the respective axes and the elapsed time.

Hereinbelow, as an exemplary case of a cutting tool moving along a track P on a three-dimensional coordinates shown in FIG. 7, a pulse control method using the control system of FIG. 6 is described.

Figure 7:
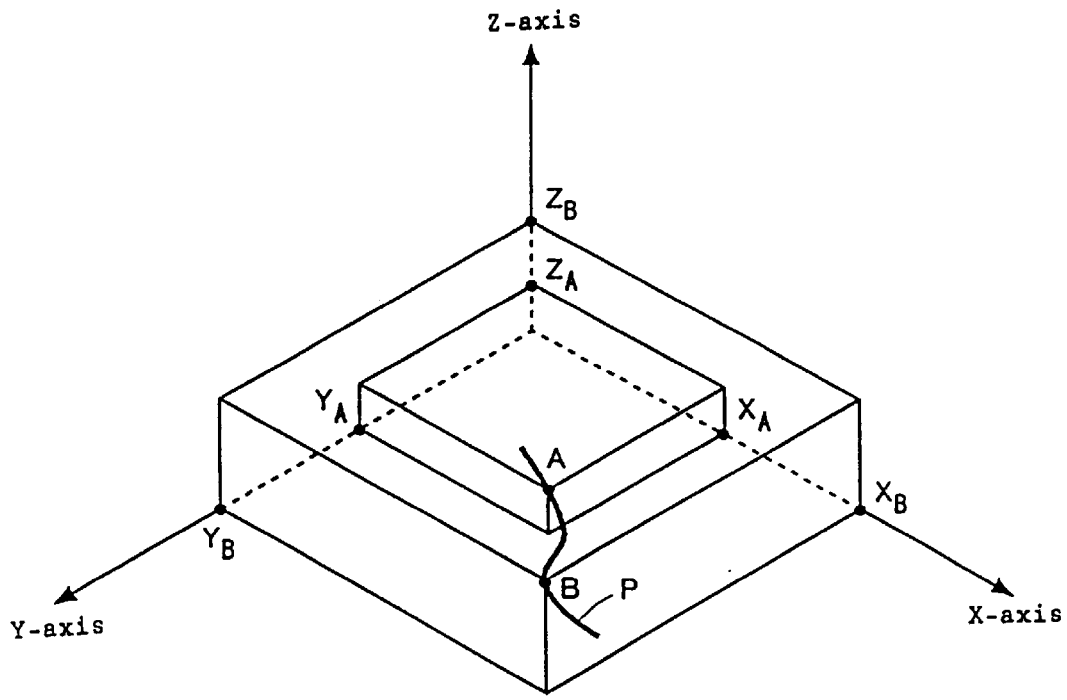
FIG. 7 is a figure showing the state in which specification is made by program so that a cutting tool moves at a fixed velocity from a point A to a point B on three-dimensional coordinates.
Figure 8:
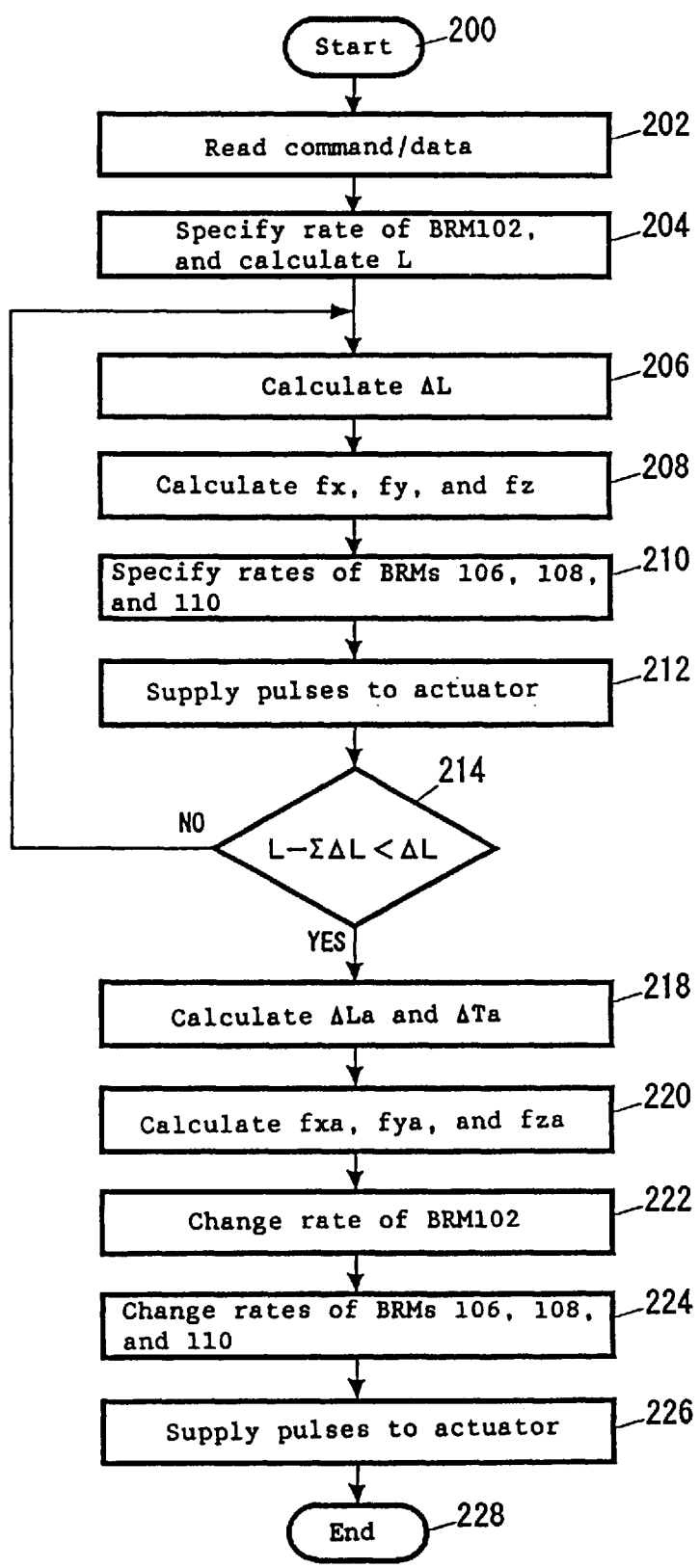
FIG. 8 is a flowchart for explaining an embodiment of the pulse control method used in the control system of the present invention.

FIG. 7 shows that the cutting tool is specified by a program so as to move from a point A to a point B on the three-dimensional coordinates at a fixed velocity. Since, in the program, no coordinate is provided between the points A and B, the control system determines the coordinates between the points A and B by an interpolation calculation. FIG. 8 shows a flowchart for the machine tool control method using the control system of the present invention.

In block 200, the actuator control is initiated, and in block 202, the MPU 120 reads out an execution command and data on coordinates and the specified velocity F from the memory 122. The execution command includes an instruction on the method of interpolation from the point A to the point B on the track P.

In this embodiment, the assumption is made that a linear interpolation is performed between the points A and B. However, the applicable interpolation methods in the present invention are not limited to the linear interpolation, but include circular interpolation, spline interpolation, and multidimensional interpolation commands such as Lagrange and Newton. In the linear interpolation, the coordinates of two points on the track are used, and the coordinates of three points are used in the circular interpolation, while the coordinates of three or more points are used in the spline interpolation to perform a calculation.

When the cutting tool moves from the point A to the point B along the interpolated straight line in a predetermined time, it needs to move between the coordinates $(X_A, X_B)$, $(Y_A, Y_B)$, and $(Z_A, Z_B)$ on the respective axes simultaneously.

Figure 9:
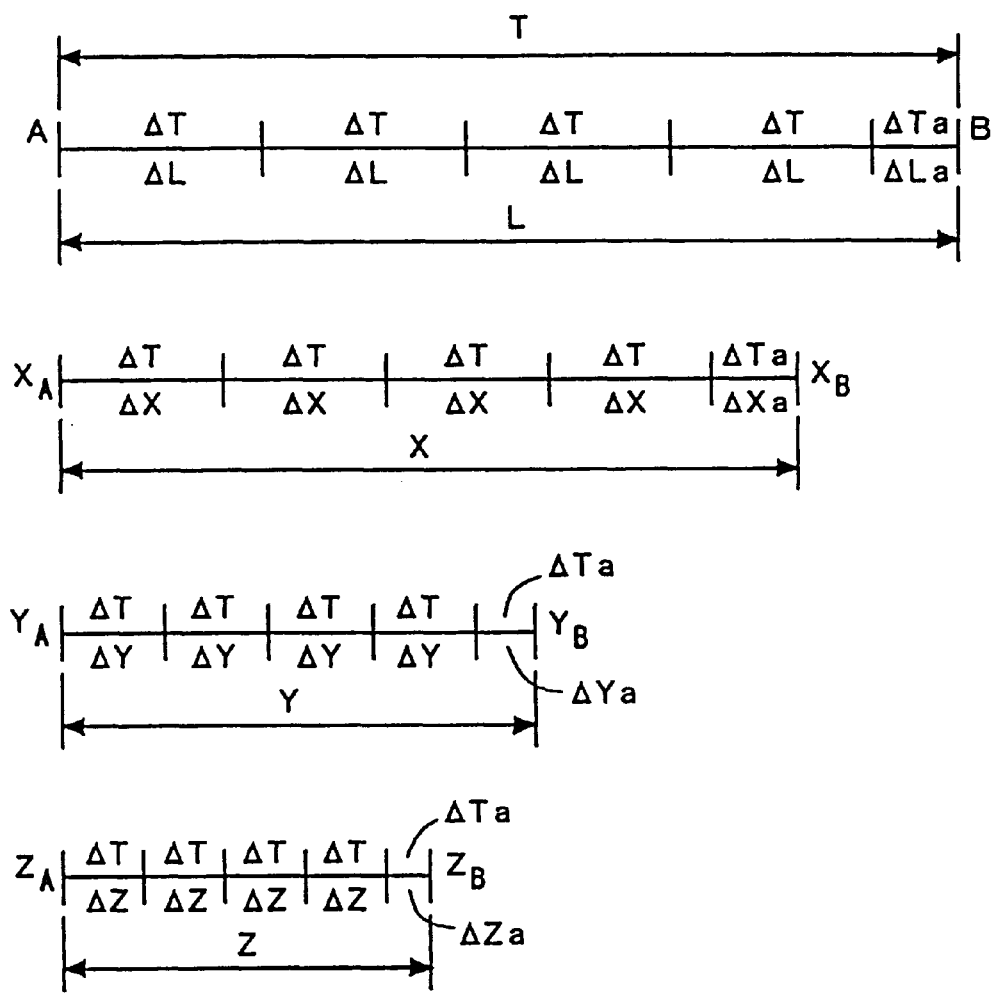
FIG. 9 is a figure for explaining the moving distance and moving time of the actuator on each axis when a linear interpolation with a straight line of a length L is performed between the point A and the point B.

FIG. 9 describes the moving distance and moving time of the actuator on each axis when a linear interpolation is performed with a straight line of a length L between the point A and the point B. The length L represents the length of the interpolated straight line drawn between the point A and the point B, and a length X, a length Y, and a length Z represent the length components of the respective axes which correspond to the length L. A time T is a time during which the cutting tool moves along the length L, and has a relationship $F=L/T$ with the programmed specified velocity F.

To move the cutting tool along the straight line of the length L at the specified velocity, pulses of predetermined frequencies fx, fy, and fz are supplied to the actuators on the respective axis. In this embodiment, the time T is subdivided into minute times $\Delta T$, and the MPU calculates a minute length $\Delta L$ along which the cutting tool must move within the minute time $\Delta T$, according to the minute time $\Delta T$ and the specified velocity F.

The minute time $\Delta T$ is determined in the system based on the parameters such as the throughput of the MPU, and the loads on the MPU such as the coordinate transformation. The smaller the minute time $\Delta T$, more accurate coordinates can be given to the actuator with respect to the path to be interpolated. The control system of this embodiment calculates the minute length components $\Delta X$, $\Delta Y$, and $\Delta Z$ of the respective axis from the minute length $\Delta L$, and calculates the pulse frequency of each axis during a certain minute time $\Delta T$. If a linear interpolation is performed on three-dimensional coordinates as in this embodiment, the moving amount of the actuators on the respective axis for each minute time $\Delta T$ can be made equal.

However, if a circular interpolation is performed on three-dimensional coordinates or a linear interpolation is performed on the coordinates of an articulated system, the moving amount for each minute time $\Delta T$ on each axis must be a different value, and thus the number of pulses to be supplied to the actuator for each minute time $\Delta T$, or the pulse frequency is calculated to control the operation of the actuator on each axis. FIG. 10 describes the interpolated straight line of a length L and the movement of the actuator on each axis if a machine tool including actuators of the articulated system is controlled, and θ represents an angle.

Returning to FIG. 8, in block 204, the rate input of the multiplier 102 is specified. The MPU 120 calculates the frequency fo of pulses from the minute time ΔT and the number of bits of the multiplier, determines the designation rate of the multiplier 102 from the frequency fo and the frequency fi, and sends a bit pattern to the input register 104. The input register 104 supplies the bit pattern of the designation rate to the rate input of the multiplier 102 in parallel, and the multiplier 102 converts pulses of the frequency fi to pulses of the frequency fo while repeating a reset by count-up, on a condition that the designation rate is not changed. Further, the MPU calculates the length L of the straight line between the point A and the point B from the coordinates of the points A and B.

In block 206, the MPU calculates the minute length ΔL from the specified velocity F of the cutting tool which is specified in the program, and the minute time ΔT.

The MPU frther calculates the minute length components ΔX, ΔY, and ΔZ which are the vector components of the respective axes, which are corresponding to the minute length ΔL.

In block 208, for movement through the vector components ΔX, ΔY, and ΔZ of the respective axis, the number of pulses ΔPx, ΔPy, and ΔPz which are applied to the respective actuators 124, 126, and 128 within a minute time ΔT are calculated, and the frequencies fx, fy, and fz of the output pulses of the multipliers 106, 108, and 110 are calculated.

In block 210, the MPU 120 calculates designation rates from the frequency fo of the input pulses of the multipliers 106, 108, and 110 and the frequencies fx, fy, and fz of the output pulses of them, and sends the respective bit patterns to the input registers 112, 114, and 116 simultaneously. The input registers 112, 114, and 116 supply the bit patterns of the designation rates to the rate inputs of the respective corresponding multipliers in parallel.

In block 212, pulses of the frequencies fx, fy, and fz are sent to the actuators on the respective axes from the respective multipliers, and each actuator operates at a velocity corresponding to the pulse frequency. The designation rates inputted to the rate inputs of the respective multipliers 106, 108, and 110 are not changed until the multipliers operate in a cycle corresponding to the minute time ΔT and count up, and other designation rates are indicated from the MPU when they count up. The other designation rates are substantially the same value in this embodiment in which a linear interpolation is performed on orthogonal three-dimensional coordinates.

Thereafter, for every minute time ΔT, each actuator receives pulses in a number corresponding to the movement through the minute length component on each axis, which corresponds to each minute length ΔL, and the cutting tool moves continuously.

If the minute length components ΔX, ΔY, and ΔZ of the respective axes are different from each other, the designation rates and output pulse frequencies of the respective multipliers are different from each other, and the actuators 124, 126, and 128 move at different velocities, respectively. However, the cutting tool moves on the interpolated straight line at a fixed velocity since the respective actuators operate in synchronism with each other.

Returning to FIG. 9, the time T and minute times ΔT and ΔTa in this embodiment are described. As described above, since the minute time ΔT is determined from the throughput of the MPU and the like, and the specified velocity F of the cutting tool is directed by a program, the minute length ΔL is determined by F ×ΔT. Since there is no direct relation between the minute time ΔT and the interpolated length L depending on the coordinates indicated by the program and the specified velocity F, the division of the length L by the minute length ΔL produces a minute length ΔLx different from the minute length ΔL. The minute length ΔLx is shown as a minute length ΔLa shorter than the minute length ΔL or a minute length ΔLb longer than the minute length ΔL. Producing a minute length ΔLb is described hereinbelow. For the minute length ΔLa, minute length components ΔXa, ΔYa, and ΔZa are also generated on the respective axes. When the cutting tool also is moved in the minute length ΔLa at the specified velocity F, the minute time ΔT must be changed to a minute time ΔTa determined by the relation between the specified velocity F and the minute length ΔLa. To change the minute time ΔT to the minute time ΔTa, the frequencies of the input pulses of the multipliers 106, 108, and 110 are changed.

In block 214, to determine the timing for changing the frequencies of the input pulses to the multipliers, the MPU calculates the sum ΣΔL of the minute lengths ΔL, and compares the sum ΣΔL with the length L to determine which is greater.

If L−ΣΔL is greater than ΔL, then it means that the stage has not been reached at which the MPU executes the minute length ΔLa, and thus the process returns to block 206 where the next minute length ΔL is calculated with the minute time ΔT being unchanged, and the minute length components ΔX, ΔY, and ΔZ of the respective axes are calculated. Since, in this embodiment, the linear interpolation is taken as an example, the components of the respective axis for the next ΔT are also ΔX, ΔY, and ΔZ, respectively.

If L−ΣΔL is smaller than the minute length ΔL in block 214, the process goes to block 218, where the MPU calculates the minute length ΔLa with L−ΣΔL to accurately move the cutting tool to the point B of the interpolated straight line for completing the execution of the command which was given first. Further, the MPU calculates the minute time ΔTa from the minute length ΔLa and the specified velocity F.

Then, in block 220, the MPU calculates the minute length components ΔXa, ΔYa, and ΔZa of the respective axes which are corresponding to the minute length ΔLa, and calculates the number of pulses to be applied to the actuators within the minute time ΔTa corresponding to the respective minute length components, or the frequencies fxa, fya, and fza of the output pulses of the multipliers 106, 108, and 110.

In block 222, the designation rate of the multiplier 102 is calculated from a pulse frequency foa necessary for obtaining the minute time ΔTa calculated in block 218, and a bit pattern is provided to the rate input to change the designation rate.

In block 224, the designation rate is changed so that the multipliers 106, 108, and 110 output pulses corresponding to the minute length components ΔXa, ΔYa, and ΔZa of the respective axis during the minute time ΔTa. As a result, the respective multipliers convert input pulses of the frequency foa to output pulses of the frequencies fxa, fya, and fza. Block 224 is executed simultaneously with block 222.

Further, the process goes to block 226, where the respective actuators receive pulses of the frequencies fxa, fya, and fza, and move on the minute length components ΔXa, ΔYa, and ΔZa of the respective axis during the minute time ΔTa. Since, in this embodiment, the minute time ΔTa is also changed to keep the specified velocity F when the minute length ΔL is changed to ΔLa, the specified velocity F can be maintained between the interpolated coordinate points.

The execution of the interpolated length based on the initial command is completed in block 228, and before the cutting tool travels to the point B through the interpolated coordinate space with the elapse of the minute time ΔTa, the MPU starts a similar procedure from block 202, receives the next command and coordinates from the memory and completes the necessary calculation, and continuously sends pulses to the actuators.

Figure 11:
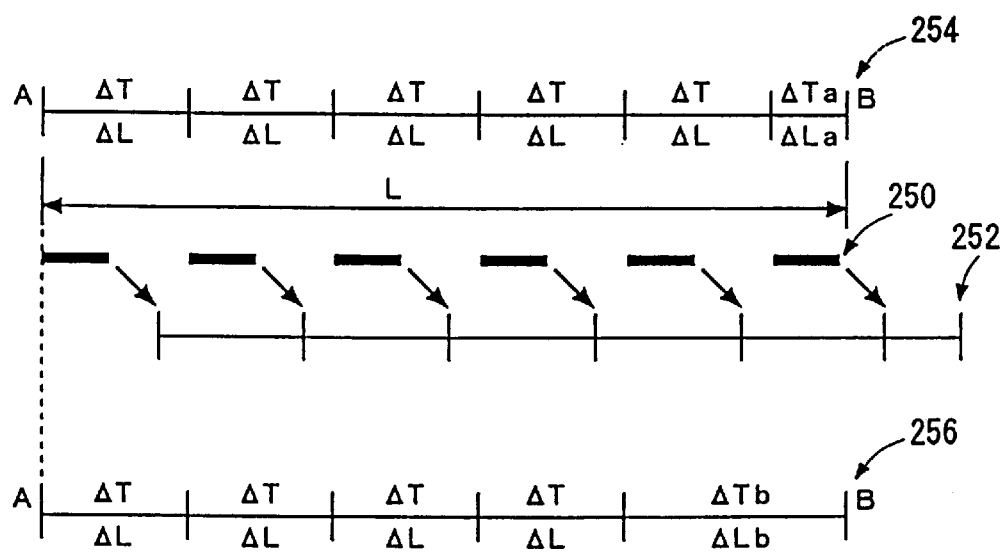
FIG. 11 is a figure for explaining an embodiment in which the determination of execution timing for ΔLx (e.g., which is performed in block 216 in FIG. 8) is performed by another method.

Referring to FIG. 11, another embodiment is described in which the determination made in block 214 in FIG. 8 as to the execution timing of the minute length ΔLa is performed in a different manner.

Line 250 in FIG. 11 indicates the time during which the MPU calculates the designation rates of the multipliers within each minute time ΔT. Line 252 shows the state in which the respective actuators are continuously moving while receiving the designation rates calculated in the MPU from the multipliers 106, 108, and 110. The MPU performs the coordinate calculation for each axis corresponding to the minute length ΔL within the minute time ΔT, and calculates the number of pulses supplied to the actuator on each axis to change the designation rate of each multiplier. For an actuator of the articulated system, the calculation for coordinate transformation is also performed within this time. When the multipliers 106, 108, and 110 count up at a certain designation rate in the first minute time ΔT, the MPU supplies the designation rate in the next minute time ΔT, and the multipliers supply pulses of the frequency corresponding to the designation rate to the actuators.

Accordingly, the designation rate of the multipliers is changed at a point of time somewhat after the time at which the MPU terminates the calculation, and pulses of the changed frequency are supplied to the actuators. To continuously move the actuator according to the designation rate for every minute time ΔT without interrupting the linkage of the minute times ΔT, the MPU must terminate the calculation necessary for the operation of the actuator corresponding to the minute time ΔT within the minute time ΔT. If the condition of ΔLa<ΔL is set in line 254 as described in FIGS. 8 and 9, the MPU possibly cannot terminate the calculation within the minute time ΔTa (<ΔT).

To solve this problem, a minute time ΔLb (>ΔL) is set as shown by line 256. In block 216 in FIG. 8, the designation rate of the multiplier 102 can be changed in a similar manner by obtaining the minute time ΔLb on the condition of ΔL<(L−ΣΔL) <2ΔL, and obtaining a minute time ΔTb (>ΔT) from the specified velocity F and the minute length ΔLb. Although the lines 254 and 256 both adjust the last minute length ΔL reaching the interpolated length L, the concept of the present invention also includes the setting of the minute length ΔL at any position on the line 254 or 256 to ΔLa or ΔLb. If the adjusted position of the minute length ΔL is not the position including the coordinate end point, the adjusted position for ΔLa or ΔLb is determined first, and the designation rate of the multiplier 102 is changed when executing that portion.

Hereinbelow, another machine tool control method using the control system of FIG. 6 is described.

In FIG. 12, it is assumed that three points of programmed coordinates A, B, and C are linearly interpolated, and a cutting tool is made to travel along a segment AB and a segment BC. The connecting point B of the segment AB and the segment BC is called an "inflection point". The specified velocity F of the cutting tool is previously directed by a program to a velocity suitable for moving the cutting tool over the whole path.

However, if the angle a between the segment AB and the segment BC becomes large, the mechanical system including the actuators and cutting tool cannot track the interpolated path at the specified velocity F, and is displaced as shown by a dotted line 304. If the specified velocity F is reduced in the vicinity of the sharp inflection point B, the path can be accurately traced. This is well known as "override". The control method of this embodiment executes an override without changing the program or externally indicating velocity change each time.

Figure 13:
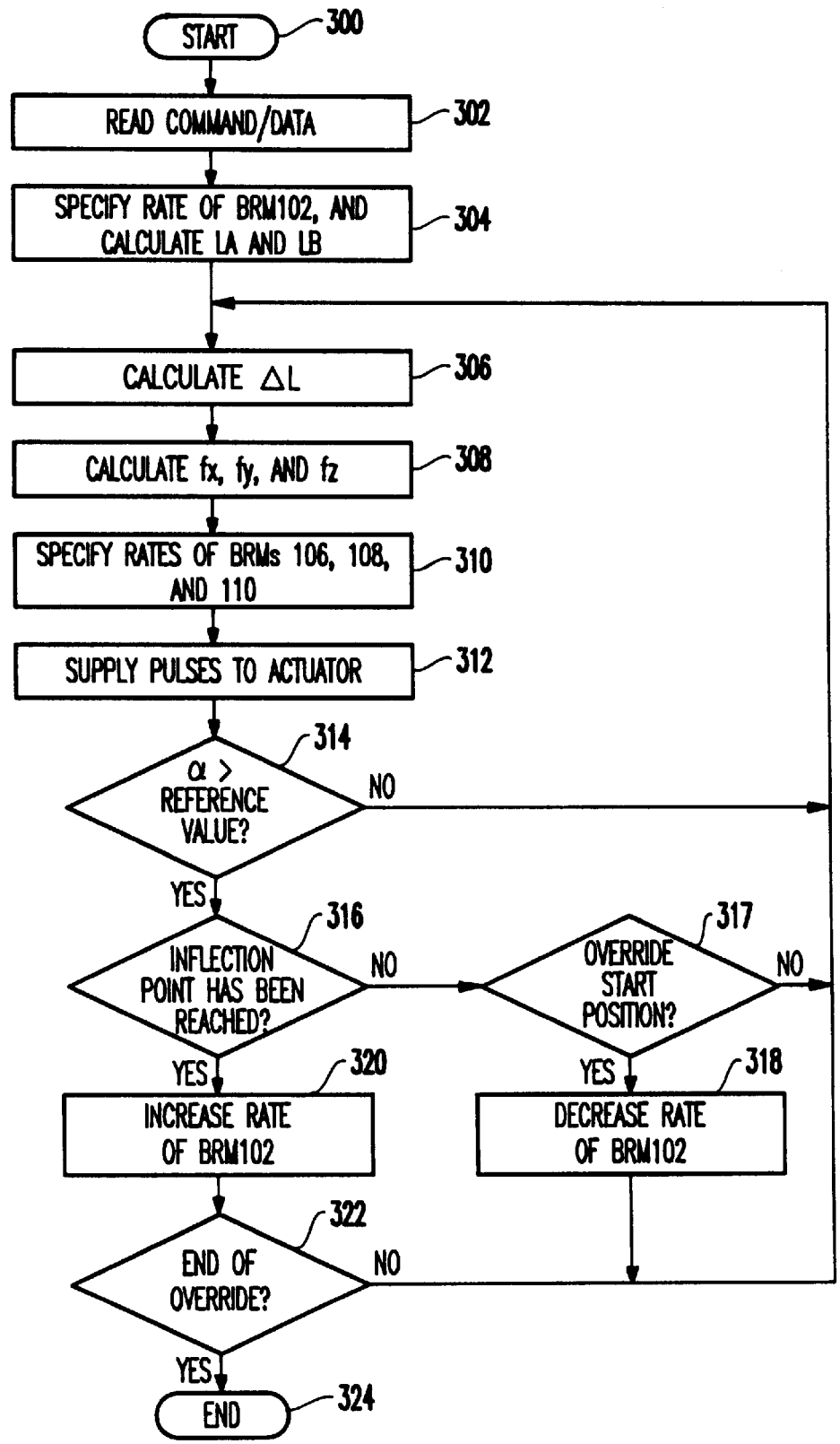
FIG. 13 is a flowchart for explaining another embodiment of the operation of the control system of the present invention.

FIG. 13 is a flowchart showing a control method including an override. The description of the portions the same as the contents described in FIG. 8 is simplified, for brevity.

In block 300, the actuator control is started. In block 302, the MPU reads out from a memory an execution command, and data on the coordinates necessary for at least two interpolations for determining the execution of the override, and on the specified velocity F. In this embodiment, as an exemplary case, three points A, B, and C as coordinates and a command for linear interpolation are read out.

In block 304, the input rate of the multiplier 102 is specified from the minute time ΔT calculated in the system and frequency fi of input pulses. Further, the coordinates of the interpolated straight line of a length LA between the coordinates A and B, and the coordinates of the interpolated straight line of a length LB between the coordinates B and C are calculated. In block 306, the minute length ΔL is calculated.

In block 308, the frequencies fx, fy, and fz of pulses applied to the respective actuators are calculated from the minute length ΔL and the minute time ΔT. In block 310, the designation rates of the multipliers 106, 108, and 110 are changed.

In block 312, pulses of the respective frequencies are supplied to the t respective actuators, and the operations of the respective actuators are vector-composed to cause the cutting tool to travel along the specified path at the specified velocity.

In block 314, the angle a at the intersecting point between the interpolated straight line of a length LA and the interpolated straight line of a length LB is calculated, and it is determined whether or not the angle α is greater than a reference value. If the angle α is smaller than the reference value, the process returns to block 306 since there is no need for override, repeating a similar procedure for the next minute length ΔL.

If the angle α is greater than the reference value in block 314, the process goes to block 316 to perform an override. The position for starting the override can be set as any minute length ΔL portion dividing the length LA between the point A and the point B in FIG. 12.

In block 316, it is determined whether the execution of the above procedure has reached the inflection point B shown as the point B in FIG. 12. If the inflection point B has not been reached yet, it is determined in block 317 whether the procedure has advanced to the position for starting the override. The position for starting the override can be set to any minute length ΔL dividing the length LA between the point A and the point B in FIG. 12. If the position for starting the override has been reached, the process goes to block 318 where the designation rate of the multiplier 102 is made lower than the initially set value to decrease the frequency fo, thereby to uniformly reduce the velocity of the actuator on each axis. The value of the reduced designation rate can be stored in a table in the memory.

Then, the process returns to block 306 to execute a loop of blocks 318, 306, 308, 310, 312, 314, and 316. During the execution of the loop, the designation rate of the multiplier 102 is gradually decreased in block 318 to gradually lower the velocity of the cutting tool, and it is continued until it is determined in block 316 that the execution to the inflection point B has been terminated.

If it is determined in block 316 that the execution of the procedure has reached the inflection point B, the process goes to block 320 to increase the rate of the multiplier 102. As long as it is not determined in block 322 that the procedure has reached the position for ending the override, the loop of blocks 320, 322, 306, 308, 310, 312, 314, and 316 is executed. During this operation, the designation rate of the multiplier 102 is gradually increased in block 320 to gradually increase the velocity of the cutting tool.

In block 322, the position of any minute length ΔL dividing the length LB between the point B and the point C in FIG. 12 is determined to be the position for ending the override. The position for ending the override is preferably selected so that it is nearly equal to the length to the position for starting the override based on the inflection point. The amount of the gradual increase of the designation rate in block 320 is set so that the velocity of the cutting tool recovers to the specified velocity F at the position for ending the override.

The selection of the position for starting the override in block 317, the selection of the amount of gradual decrease of the designation rate in block 318, the selection of the position for ending the override in block 322, and the selection of the amount of gradual increase of the designation rate in block 320 can be made by selection from the values stored in a lookup table prepared according to the value of the angle α.

Specifically, the sharper the angle α is, preferably the override is started from the minute length ΔL at a position more distant from the inflection point B between the point A and the point B in FIG. 12, thereby to make the velocity of the cutting tool at the inflection point B lower. To restore the velocity of the cutting tool, selection is preferably made so that, on both sides of the inflection point B, the increase and decrease rates of the cutting tool velocity at each minute length ΔL position become symmetrical.

By the above procedure in the embodiment of the present control method, override is performed at an appropriate velocity according to the degree of inflection while searching for a sharp inflection point. Since, in this embodiment, linear interpolation was used exemplarily, the need for override is determined by calculating the angle a between the segment AB and the segment BC. However, if other interpolation methods such as circular interpolation are included, then the angle between the tangents of the respective segments at the connecting point of the interpolated segments is calculated.

Figure 14:
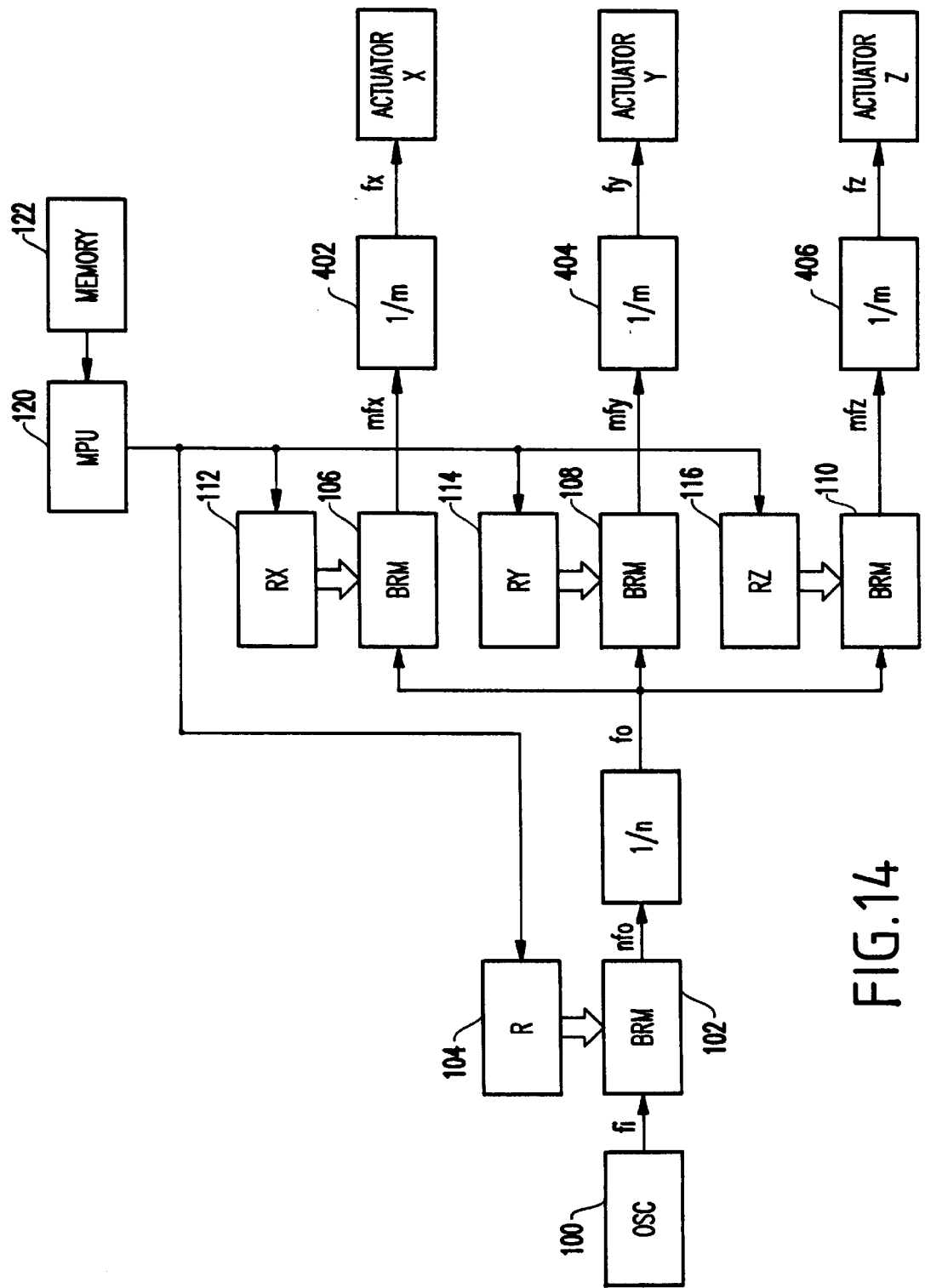
FIG. 14 is a block diagram of another embodiment of the control system of the present invention.

Referring to FIG. 14, an embodiment of the present invention is described for a pulse control system in which actuators can be smoothly driven by reducing the effect ofjitter inherent in the multiplier.

The control system of FIG. 14 is the same as the control system of FIG. 6 except for the addition of dividers 400, 402, 404, and 406, and the other blocks assigned with the same reference numerals are the same as those in FIG. 6, so the description thereof is omitted for brevity.

To the pulse output of the multiplier 102, a 1/n divider is connected, and to the outputs of the multipliers 106, 108, and 110, 1/m dividers 402, 404, and 406 are connected. It is known that, to reduce the jitter of the output frequency of the multiplier, it is effective to previously multiply the input pulse frequency of the multiplier by n, and dispose a 1/n divider on the output of the multiplier. In this embodiment, for the multiplier 102, the MPU supplies the input register 104 with a bit pattern of the designation rate having a value enabling the generation of an output frequency of n×fo (n times fo), instead of the designation rate calculated from the actually required output frequency fo. As a result, pulses of the frequency fo containing less jitter is obtained on the output of the 1/n divider 400 connected to the pulse output of the multiplier 102.

Similarly, the bit patterns of the designation rates for obtaining frequencies m times fx, fy, and fz are sent to the input registers 112, 114, and 116, respectively, for generating pulses of frequencies multiplied by m, or m×fx, m×fy, and m×fz on the output of the multipliers 106, 108, and 110, whereby pulses of the frequencies fx, fy, and fz containing less jitter on the output of the dividers 402, 404, and 406. Although the interposition of either the divider 400 or the dividers 402, 404, and 406 is effective in reducing the jitter of the frequencies fx, fy, and fz, the effect is large if both groups are interposed.

The multiplier 102 in FIGS. 6 and 14 acts as a frequency converter. Accordingly, it may be implemented by a V/F converter, the frequency of which can be controlled by the MPU, replacing the multiplier 102.

FIGS. 15 and 16 show calculation examples of the minute time ΔT of the present control system in which a 6- or 12-bit multiplier is selected as the BRM 102, 12-bit multipliers selected as the BRMs 106, 108, and 110, and ½ is selected as the dividing rates of both the divider 400 and the dividers 402, 404, and 406.

Thus, as described above and shown in the attached Figures, the present invention provides a method and system for controlling pulse-driven actuators, as well as a method and system for controlling actuators which are suitable for multi-axial or articulated machine tools or robots, and in which the operation velocity can be kept constant. Furthermore, the present invention provides a method and system for controlling actuators which make it possible to accurately trace an indicated track.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. In a system comprising a variable-frequency pulse oscillator having an output and a control input, a rate multiplier having a pulse input connected to the output of said pulse oscillator, a pulse output connected to a pulse-driven actuator, and a rate input, and a processing unit connected to the control input of said pulse oscillator and the rate input of said rate multiplier, respectively, and for controlling a controlled portion connected to said actuator by a specified path and a specified velocity, a method of controlling the output pulse of said rate multiplier, comprising:

(a) providing data on the coordinates of a plurality of points including a first point and a second point on said specified path and a specified velocity F, and a command indicating an interpolation type;

(b) calculating a route of a length L by interpolation between said first and second points according to said command, calculating a minute length ΔL shorter than said interpolated length L and a minute length ΔLx shorter than said length L, and sending one of a first control signal for keeping said specified velocity F corresponding to said minute length ΔL and a second control signal for keeping said specified velocity F corresponding to said minute length ΔLx to said pulse oscillator; and (c) sending one of a designation rate corresponding to said minute length ΔL and a designation rate corresponding to said minute length ΔLx to said rate multiplier.

2. In a system comprising a variable-frequency pulse oscillator having an output and a control input, a rate multiplier having a pulse input connected to the output of said pulse oscillator, a pulse output connected to a pulse-driven actuator, and a rate input, and a processing unit connected to the control input of said pulse oscillator and the rate input of said rate multiplier, respectively, and for controlling a controlled portion connected to said actuator by a specified path and a specified velocity, and a method of controlling the output pulse of said rate multiplier, comprising:

(a) providing data on the coordinates of a plurality of points including a first point and a second point on said specified path and a specified velocity F, and a command indicating an interpolation type;

(b) setting the minute time ΔT;

(c) sending a first control signal for keeping said specified velocity F to the control input of said pulse generator, calculating a route of a length L by interpolation between said first and second points, calculating a minute length ΔL shorter than said interpolated length L, which is a length on which said controlled portion moves within said minute time ΔT, and sending a plurality of designation rates corresponding to said minute length ΔL to said multiplier; and (d) calculating a minute length ΔLa shorter than said minute length ΔL by L−ΣΔL, sending a second control signal corresponding to said minute length ΔLa for keeping said specified velocity F to said pulse generator, and sending a designation rate corresponding to said minute length ΔLa to said multiplier.

3. The control method as set forth in claim 2, wherein said step (d) comprises:

calculating a minute length ΔLb longer than said minute length ΔL and shorter than double said minute length ΔL by L−ΣΔL;

sending a third control signal corresponding to said minute length ΔLb for keeping said specified velocity F to said pulse oscillator; and sending a designation rate corresponding to said minute length ΔLb to said multiplier.

4. The control method as set forth in claim 2, wherein said control system further comprises a plurality of working axes, said actuators are provided correspondingly to said plurality of working axis and operate in synchronism with each other, and said rate multiplier is provided correspondingly to said each actuator, wherein said step (c) includes calculating the minute length component of each axis which is corresponding to said minute length ΔL, and sending a designation rate corresponding to said minute length component to said multipliers, respectively, and wherein said step (d) includes calculating a minute length component of each axis which is corresponding to said minute length ΔLa, and sending a designation rate corresponding to said minute length component to said multiplier, respectively.

5. The control method as set forth in claim 3, wherein said control system further comprises a plurality of working axes, said actuators are provided correspondingly to said plurality of working axis and operate in synchronism with each other, and said rate multiplier is provided correspondingly to said each actuator, wherein said step (c) includes calculating the minute length component of each axis which is corresponding to said minute length ΔL, and sending a designation rate corresponding to said minute length component to said multipliers, respectively, and wherein said step (d) includes calculating a minute length component of each axis which is corresponding to said minute length ΔLa, and sending a designation rate corresponding to said minute length component to said multiplier, respectively.

6. In a system comprising a variable-frequency pulse oscillator having an output and a control input, a rate multiplier having a pulse input connected to the output of said pulse generator, a pulse output connected to a pulse-driven actuator, and a rate input, and a processing unit connected to the control input of said pulse oscillator and the rate input of said rate multiplier, respectively, and for controlling a controlled portion connected to said actuator by a specified path and a specified velocity, a method of controlling the output pulse of said rate multiplier, comprising:

(a) providing data on the coordinates of a plurality of points including a first, second, and third points on said specified path and a specified velocity F, and a command indicating an interpolation type;

(b) sending a first control signal to the control input of said pulse oscillator, and (c) calculating a route of a length LA by interpolation between said first point and said second point according to said command and a route of a length LB by interpolation between said second point and said third point, calculating the angle a between the tangent of said route of the length LA at said second point and the tangent of said route of the length LB at said second point, and generating and sending a second control signal according to the magnitude of said angle α to said pulse generator.

7. The control method as set forth in claim 6, wherein the second control signal of said step (c) is sent while gradually decreasing the pulse frequency of said pulse oscillator so that the pulse frequency lowers as said controlled portion approaches said second point.

8. A system of controlling a controlled portion connected to a pulse-driven actuator by a specified path and a specified velocity F, comprising:

a variable-frequency pulse oscillator having a control input for receiving a signal controlling the output frequency, and an output;

a first rate multiplier having a pulse input, a rate input, and a pulse output, said pulse input being connected to the output of said pulse oscillator, said pulse output being connected to said actuator; and a processing unit connected to the control input of said pulse oscillator and to the rate input of said first rate multiplier, respectively, wherein said processing unit calculates a route of a length L by interpolation between said first and second points according to a command, calculates a minute length ΔL shorter than said interpolated length L and a minute length ΔLx shorter than said length L, sends one of a first control signal for keeping said specified velocity F corresponding to said minute length ΔL and a second control signal for keeping said specified velocity F corresponding to said minute length ΔLx to said pulse oscillator, and sends one of a designation rate corresponding to said minute length ΔL and a designation rate corresponding to said minute length ΔLx to said rate multiplier.

9. The control system as set forth in claim 8, wherein said variable-frequency pulse generator includes a pulse oscillator having an output, and a second rate multiplier having a pulse input connected to the output of said pulse generator, a rate input connected to said processing unit, and a pulse output connected to the pulse input of said first rate multiplier, said first or second control signal being sent to the rate input of said second rate multiplier.

10. A control system as set forth in claim 9, further comprising a divider having a dividing rate of 1/n, said divider having an input for receiving the output pulse of said second rate multiplier, and an output for supplying an output pulse to the pulse input of said first rate multiplier, wherein said rate input is set so that the frequency of the output pulse of said second rate multiplier is n times the frequency of the output pulse of said divider.

11. The control system as set forth in claim 9, further comprising a divider having a dividing rate of 1/m, said divider having an input for receiving the output pulse of said first rate multiplier, and an output for supplying an output pulse to said actuator, wherein said rate input is set so that the frequency of the output pulse of said first rate multiplier is m times the frequency of the output pulse of said divider.

12. The control system as set forth in claim 10, further comprising a divider having a dividing rate of 1/m, said divider having an input for receiving the output pulse of said first rate multiplier, and an output for supplying an output pulse to said actuator, wherein said rate input is set so that the frequency of the output pulse of said first rate multiplier is m times the frequency of the output pulse of said divider.

13. A system of controlling a controlled portion connected to a pulse-driven actuator by a specified path and a specified velocity F, comprising:

a variable-frequency pulse oscillator having a control input for receiving a signal controlling the output frequency, and an output;

a first rate multiplier having a pulse input, a rate input, and a pulse output, said pulse input being connected to the output of said pulse oscillator, said pulse output being connected to said actuator; and a processing unit connected to the control input of said pulse oscillator and to the rate input of said first rate multiplier, respectively, wherein, with respect to a first point, a second point, and a third point which are given as coordinates on said specified path, said processing unit interpolates between said first point and said second point by a route of a length LA, interpolates between said second point and said third point by a route of a length LB, calculates the angle α between the tangent of the route of the length LA at said second point and the tangent of the route of the length LB at said second point, and supplies one of a first control signal and a second control signal according to the magnitude of said angle α to the control input of said pulse oscillator.

14. The control system as set forth in claim 13, wherein said variable-frequency pulse generator includes a pulse oscillator having an output, and a second rate multiplier having a pulse input connected to the output of said pulse generator, a rate input connected to said processing unit, and a pulse output connected to the pulse input of said first rate multiplier, said first or second control signal being sent to the rate input of said second rate multiplier.

15. The control system as set forth in claim 13, further comprising a divider having a dividing rate of 1/n, said divider having an input for receiving the output pulse of said second rate multiplier, and an output for supplying an output pulse to the pulse input of said first rate multiplier, wherein said rate input is set so that the frequency of the output pulse of said second rate multiplier is n times the frequency of the output pulse of said divider.

16. The control system as set forth in claim 14, further comprising a divider having a dividing rate of 1/m, said divider having an input for receiving the output pulse of said first rate multiplier, and an output for supplying an output pulse to said actuator, wherein said rate input is set so that the frequency of the output pulse of said first rate multiplier is m times the frequency of the output pulse of said divider.

17. The control system as set forth in claim 15, further comprising a divider having a dividing rate of 1/m, said divider having an input for receiving the output pulse of said first rate multiplier, and an output for supplying an output pulse to said actuator, wherein said rate input is set so that the frequency of the output pulse of said first rate multiplier is m times the frequency of the output pulse of said divider.

* * * * *